United States Patent
Nishida et al.

(10) Patent No.: US 6,614,990 B1
(45) Date of Patent: Sep. 2, 2003

(54) VIDEO REPRODUCING APPARATUS WITH ADJUSTED MEDIA CHANGE TIMES

(75) Inventors: Yoshihiro Nishida, Tokyo (JP); Osamu Watanabe, Tokyo (JP); Masatsugu Yamamoto, Tokyo (JP); Tsuyoshi Abe, Tokyo (JP); Fumiko Oguni, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/358,482

(22) Filed: Jul. 21, 1999

(30) Foreign Application Priority Data

Nov. 11, 1998 (JP) ............................................. 10/320635

(51) Int. Cl.[7] ............................................... H04N 5/781
(52) U.S. Cl. ..................... 386/125; 386/126; 369/30.06
(58) Field of Search ..................... 386/33, 45, 111–112, 386/125–126; 369/32.01, 33.01, 34.01, 35.01, 36.01, 37.01, 38.01, 39.01, 30.06, 30.2, 30.28, 30.33, 30.3, 30.31, 30.32, 30.34, 30.35, 30.36, 30.37, 30.38; 711/714; H04N 5/76, 5/781, 9/79

(56) References Cited

U.S. PATENT DOCUMENTS 6,301,432 B2 * 10/2001 Miyawaki et al. .......... 386/125
6,408,400 B2 * 6/2002 Taketa et al. ................... 714/5

FOREIGN PATENT DOCUMENTS

| EP | 0698999 | 2/1996 |
| EP | 0774709 | 5/1997 |
| FR | 2669753 | 5/1992 |
| JP | A8 98122 | 4/1996 |
| WO | 9212515 | 7/1992 |

* cited by examiner

Primary Examiner—Thai Tran
(74) Attorney, Agent, or Firm—Birch, Stewart, Kolasch & Birch, LLP

(57) ABSTRACT

A video reproducing apparatus that stores video programs on multiple removable media, automatically changes the removable media, and supplies requested video programs to multiple terminal devices has a control unit that stores predicted times at which the programs currently being reproduced will require a change of removable media. When a program request is received, the control unit calculates the media change times of the program, and adjusts these times according to the stored predicted times. The adjustments enable all terminals to receive video programs without noise or interruption when the removable media are changed.

16 Claims, 8 Drawing Sheets

VIDEO REPRODUCING APPARATUS WITH ADJUSTED MEDIA CHANGE TIMES

BACKGROUND OF THE INVENTION

The present invention relates to an apparatus for reproducing video data spanning multiple storage media, and providing output on multiple channels.

Apparatus of this type is used in video-on-demand systems, in which a host device connected to a plurality of terminal devices supplies video programs requested by the terminal devices. The video programs are stored on disc media such as magneto-optical (MO) discs in a mass storage apparatus sometimes referred to as a jukebox. The apparatus also includes a plurality of drives for reproducing video data from the MO discs, and a mechanism for automatically transporting the discs between their storage locations and the drives.

Due to the limited storage capacity of the MO discs, a single video program may have to be stored on multiple discs. A known method of avoiding interruption of the reproduced picture while the MO discs are being changed is to record certain segments of the video data in a high-speed auxiliary storage device such as a magnetic hard disk drive. The auxiliary storage device stores a fixed-length segment leading into each MO disc, and these lead-in segments are reproduced from the auxiliary storage device while the MO discs are being changed.

The data access rate of even a high-speed hard disk drive is limited, however, so video data can be supplied from the auxiliary storage device to only a limited number of terminal devices at once. If this limited number of terminal devices are already being supplied with data from the auxiliary storage device when a further terminal device requires a change of disc, the auxiliary storage device is unable to reproduce the necessary lead-in segment, and the further terminal device experiences a temporary interruption of its video data. Depending on the length of the interruption, visual noise such as block noise may appear in the displayed picture, or the picture may freeze or go blank.

SUMMARY OF THE INVENTION

An object of the present invention is to prevent display impairments at changes of storage media in a video reproducing system.

The invention pertains to a video reproducing apparatus storing video data for a plurality of video programs on a plurality of removable media. At least some of the video programs span two or more of the removable media. The apparatus has a plurality of reproducing means for reproducing video data from the removable media, a transport means that automatically transports the removable media between their storage locations and the reproducing means, and a control unit. The control unit receives video program requests from a plurality of terminal devices, and controls the transport means and reproducing means so that each requested video program is reproduced and supplied to the requesting terminal device.

The invented method of controlling this apparatus comprises the steps of:

storing predicted times at which each video program currently being reproduced will require a change of removable media;

calculating the times at which a newly requested video program will require a change of removable media;

comparing the calculated times with the stored predicted times;

adjusting the calculated times according to the stored predicted times; and storing the adjusted calculated times as the predicted times at which the newly requested video program will require a change of removable media.

In one aspect of the invention, the calculated times are adjusted so that all of the calculated times differ from all of the stored predicted times by at least a certain interval.

In another aspect of the invention, the apparatus also has an auxiliary storage means storing and reproducing lead-in segments for each of the removable media, and a switching means for supplying video data selectively from the reproducing means and the auxiliary storage means to the terminal devices. The calculated times are adjusted so that at most a predetermined number of lead-in segments are reproduced simultaneously.

By adjusting the times at which the removable media are changed, the invention prevents the transport mechanism and auxiliary storage means from being overloaded, and enables the terminal devices to receive video signals without interruptions at changes of media.

DETAILED DESCRIPTION OF THE INVENTION

Figure 1:
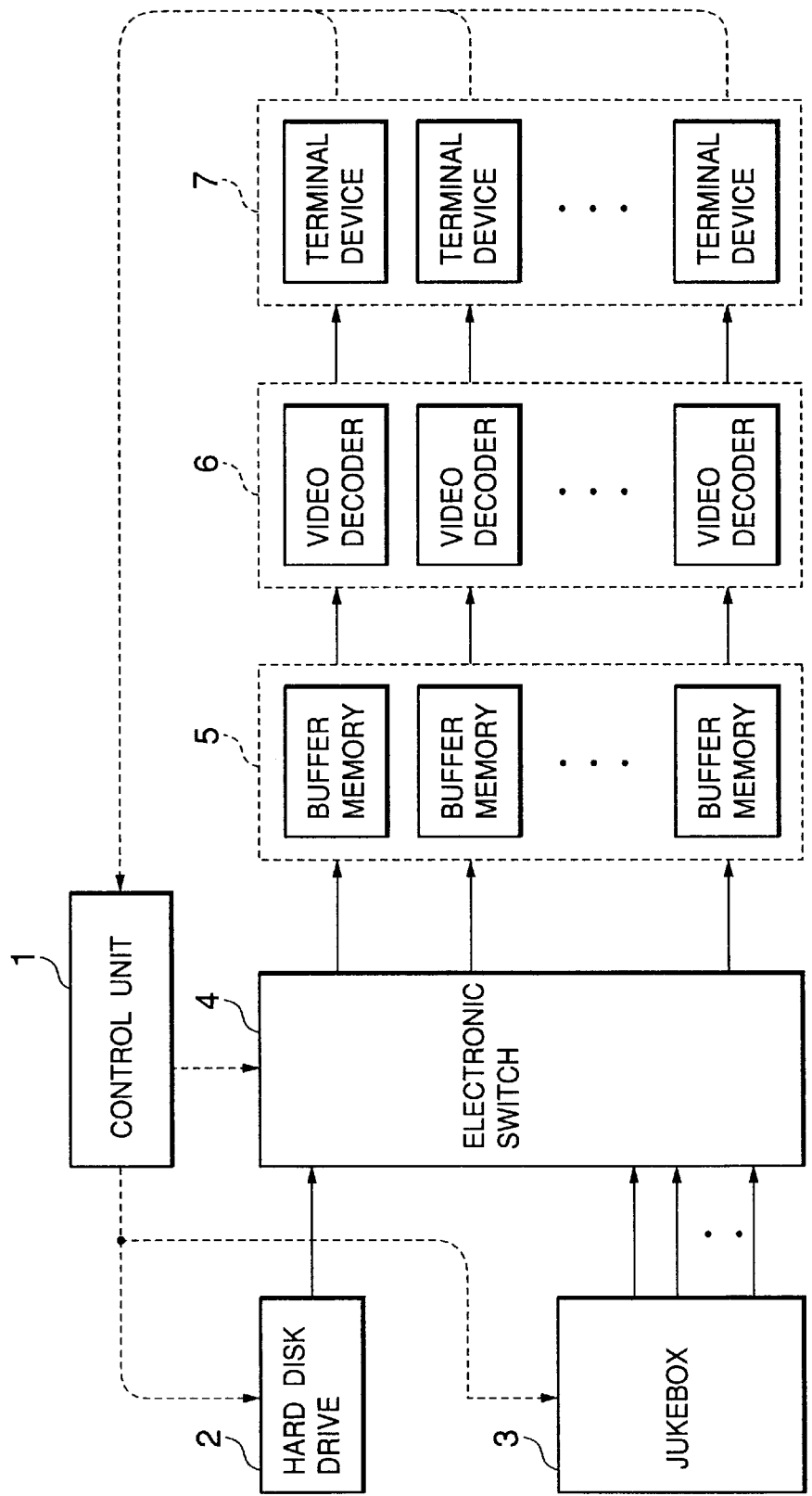
FIG. 1 is a block diagram illustrating a video-on-demand system.

A video-on-demand system embodying the invention will be described with reference to the attached drawings, in which like parts are indicated by like reference characters. Two embodiments, differing in the operation of their control units, will be described.

Referring to FIG. 1, the video-on-demand system in both embodiments comprises a control unit 1, a magnetic hard disk drive 2, a jukebox 3, an electronic switch 4, a plurality of buffer memories 5, a plurality of video decoders 6, and a plurality of terminal devices 7.

Figure 2:
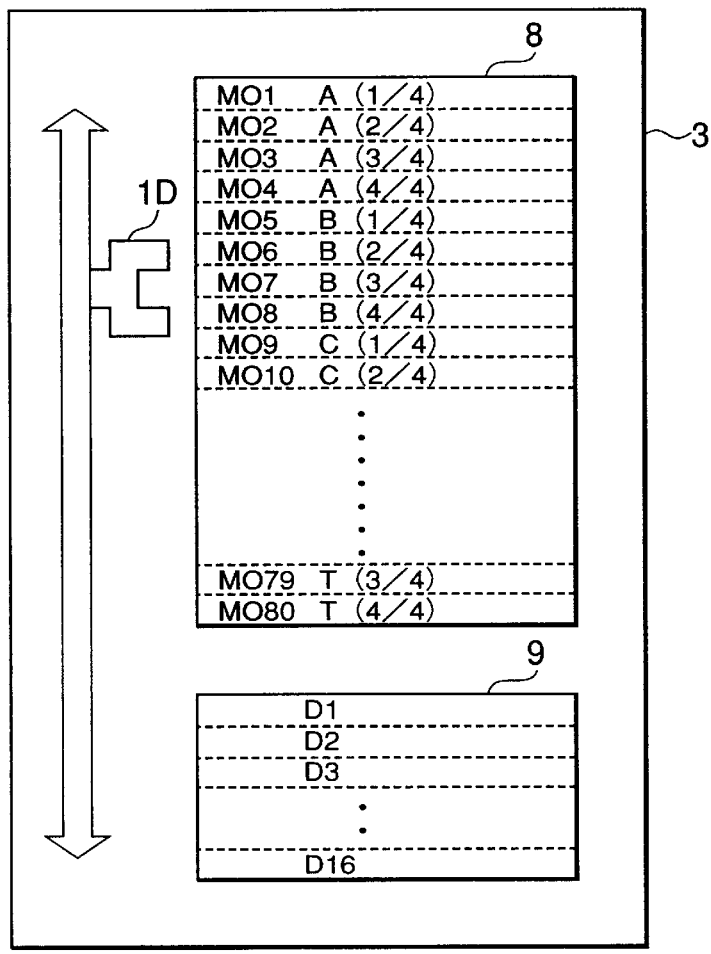
FIG. 2 shows the internal structure of the jukebox in FIG. 1.

Referring to FIG. 2, the jukebox 3 includes a storage unit 8 storing a plurality of MO discs (MO1 to MO80), a reproducing unit 9 equipped with a plurality of MO drives (D1 to D16), and a transport mechanism with a movable arm 10 for transporting MO discs between the storage unit 8 and reproducing unit 9. The MO discs are, for example, single-sided discs with a storage capacity of six hundred forty megabytes (640 MB) each. The MO discs store video data in a compressed format such as the well-known MPEG-2 format recommended by the Moving Picture Experts Group. The compressed data rate is, for example, approximately three megabits per second (3 Mbps), enabling each MO disc to store approximately half an hour of compressed video. The storage unit 8 holds, for example, twenty video programs, each approximately one hundred minutes long, each program stored on four discs. Program A is stored on discs MO1 to MO4, program B on discs MO5 to MO8, program C on discs MO9 to MO12, and so on through program T. The data stored on the x-th MO disc will be denoted MO(x), where x is a positive integer.

The MO discs do not store all of the video program data; part is stored in the magnetic hard disk drive 2 in FIG. 1. Specifically, the hard disk drive 2 stores a thirty-second lead-in segment for each MO disc. The segment leading into the x-th MO disc will be denoted H(x). Program A, for example, comprises the following non-overlapping data sequence: H(1), M(1), H(2), M(2), H(3), M(3), H(4), M(4). Lead-in segment H(2), for example, starts at the end of the M(1) data and ends at the beginning of the M(2) data.

Figure 3:
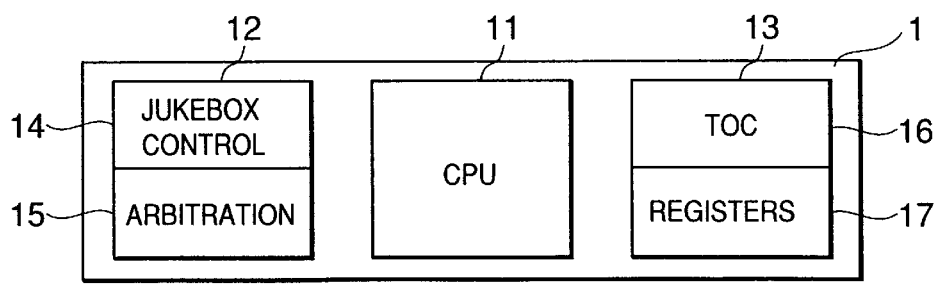
FIG. 3 shows the internal structure of the control unit in FIG. 1, according to the present invention.

Referring to FIG. 3, the control unit 1 comprises a central processing unit (CPU) 11, a read-only memory 12, and a read-write memory 13. The read-only memory 12 stores software routines executed by the CPU 11, including a jukebox control routine 14 for controlling the MO drives and movable arm 10 in the jukebox 3, an arbitration routine 15 for making timing adjustments that will be described below, and other routines (not visible). The read-write memory 13 stores data used by the CPU 11 in executing these routines, including a table of contents (TOC) 16, and a list of predicted disc change times stored in registers 17. The table of contents 16 lists the locations of the discs on which programs are stored in the jukebox 3, and gives other information such as the exact length of each program, or the exact length of the part stored on each MO disc if this length is variable. The read-write memory 13 comprises, for example, a combination of volatile and non-volatile memory devices, some or all of which may be integrated with the CPU 11.

Referring again to FIG. 1, the hard disk drive 2 and electronic switch 4 are controlled by the control unit 1. The electronic switch 4 routes compressed video data output from the hard disk drive 2 and the jukebox 3 to the buffer memories 5 for temporary storage. The video decoders 6 decode the data stored in the buffer memories 5, and send the decoded video data as video signals to the terminal devices 7. Each of the video data paths from the electronic switch 4 to a terminal device 7 is referred to as a channel. Each terminal device 7 has a screen for displaying a video picture, and a device enabling a human user to enter requests, which are sent to the control unit 1.

With sixteen MO drives in the reproducing unit 9 in the jukebox 3, the system can serve up to sixteen terminal devices 7 at once. The system is not limited to this number of terminal devices 7, however; the number of terminal devices 7 may be greater than or less than the number of MO drives. The buffer memories 5, video decoders 6, and terminal devices 7 can be interconnected in various ways. For example, a buffer memory 5, a video decoder 6, and a terminal device 7 may be integrated into a single unit. Alternatively, a terminal device 7 may be connected to a video decoder 6 by a transmission line or cable.

Next, the operation of the first embodiment will be described.

Figure 4:
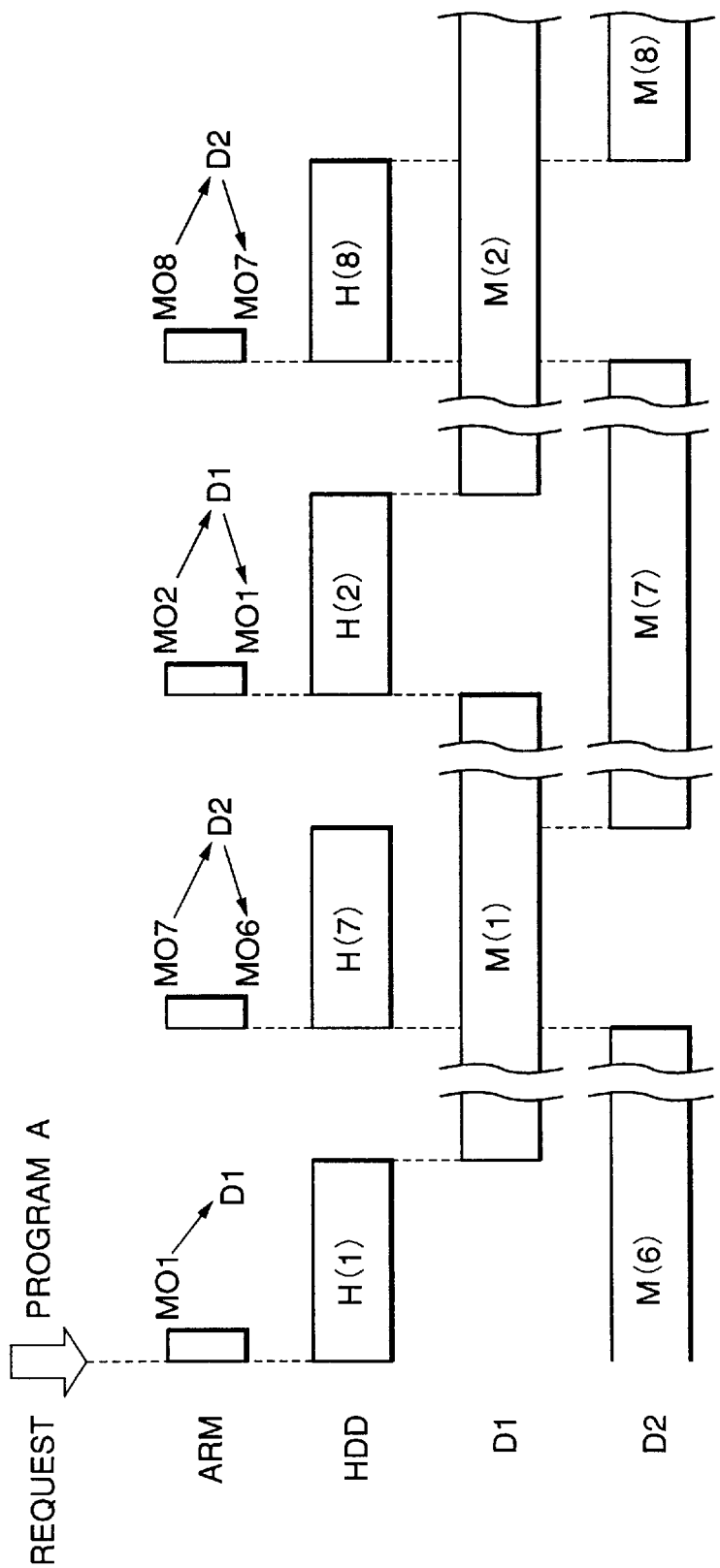
FIG. 4 illustrates the reproduction of a video program.

Referring to FIG. 4, when a user at a terminal device 7 enters a request for a particular program, such as program A, the control unit 1 selects an available MO drive, drive D1 for example, refers to the table of contents 16, and commands the movable arm 10 to load the first MO disc on which the requested program A is stored (disc MO1) into the selected drive (D1). At the same time, the control unit 1 commands the hard disk drive 2 to begin reproducing the first lead-in segment H(1) of program A, and commands the electronic switch 4 to route the H(1) data to the appropriate buffer memory 5.

The disc transport and loading operation takes, for example, approximately five seconds. During this interval and for the next approximately twenty-five seconds, the H(1) data are transferred from the hard disk drive 2 to the buffer memory 5, decoded by the video decoder 6, sent as a video signal to the terminal device 7, and displayed on a screen at the terminal device 7. When all of the H(1) data have been transferred from the hard disk drive 2 to the buffer memory 5, the control unit 1 commands drive D1 to begin reproducing data M(1), and changes the setting of the electronic switch 4 so that the reproduced data M(1) are transferred to the buffer memory 5. The video decoder 6 continues decoding the data sent to the buffer memory 5 and supplying a video signal to the terminal device 7. The display on the terminal device 7 is uninterrupted by the changeover from the lead-in segment H(1) to the data M(1) reproduced by drive D1.

When the end of data M(1) is reached, the control unit 1 commands the hard disk drive 2 to begin reproducing lead-in segment H(2), and commands the electronic switch 4 to select the data reproduced by the hard disk drive 2. Lead-in segment H(2) is decoded and displayed in the same way as H(1), with no interruption of the video signal supplied to the terminal device 7. In addition, the control unit 1 commands the movable arm 10 to unload disc MO1 from drive D1, and load disc MO2 in its place. This operation is completed well within the thirty-second duration of lead-in segment H(2). At the end of lead-in segment H(2), MO drive D1 begins reproducing data MO(2). Program A is reproduced in its entirety in this way, ending with the data MO(4) on disc MO4, without pause or interruption.

In FIG. 4, the request for program A comes at a time when program B is already being displayed at a different terminal device 7, using MO drive D2. The hard disk drive 2 reproduces the lead-in segments of the MO discs of both programs, as illustrated. Lead-in segments H(7) and H(8) belong to program B.

Next, the operation of the control unit 1 will be described in more detail.

Before the control unit 1 commands the hard disk drive 2 to start reproducing the first lead-in segment of a newly requested video program, the arbitration routine 15 predicts the times at which a change of MO discs will be necessary for the newly requested program. These disc change times are predictable from the number of discs and the lengths of the video data recorded on each disc. The information necessary for predicting the disc change times is read from the table of contents 16. The predicted disc change times are stored in the registers 17. The starting time of the program is also treated as a disc change time.

Figure 5:
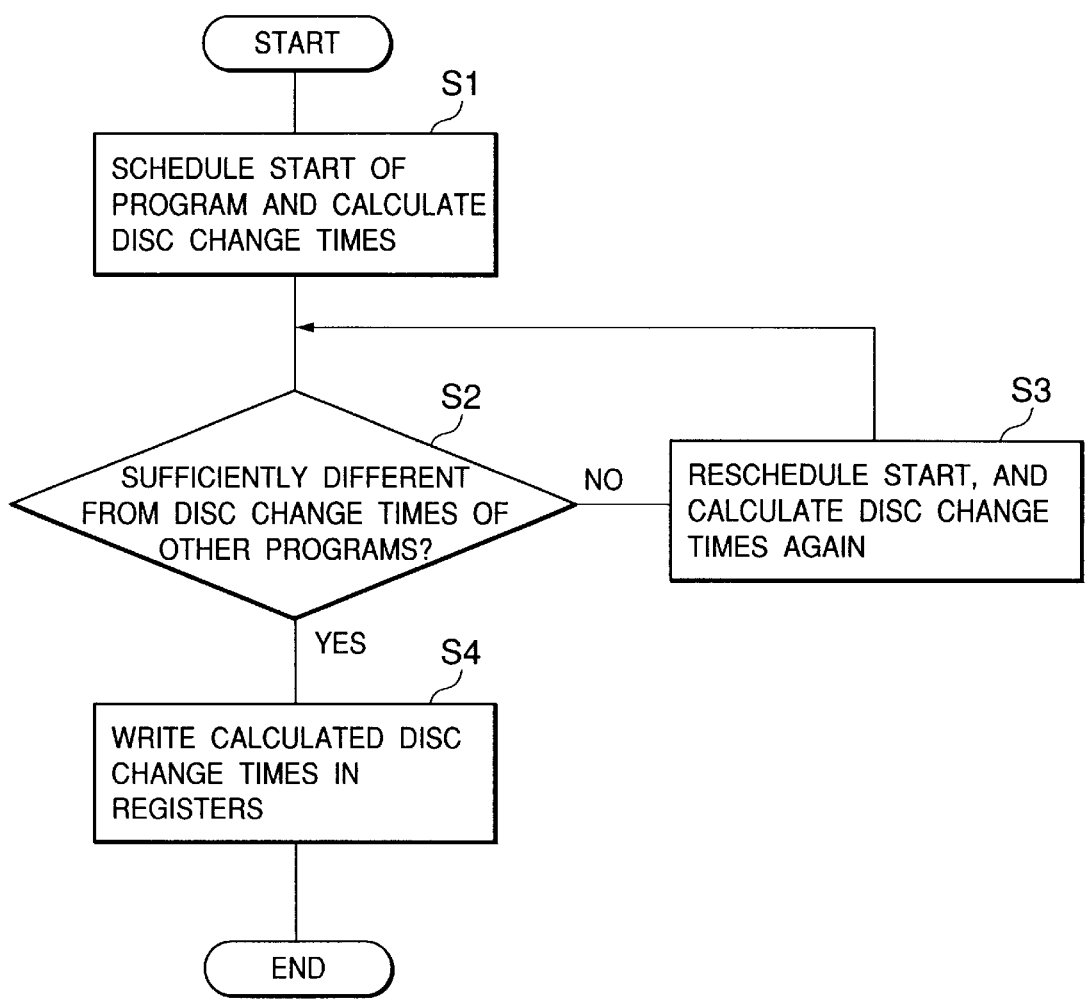
FIG. 5 is a flowchart illustrating arbitration in a first embodiment of the invention.

Referring to FIG. 5, upon receiving a new program request, if a drive is available, the arbitration routine 15 tentatively schedules reproduction of the program to start at a certain time, such as the present time, calculates the resulting disc change times (step S1), and compares the disc change times with the predicted disc change times of other programs that are already being reproduced (step S2). If any one of the calculated disc change times of the newly requested program is within ten seconds of a disc change time of a program already being reproduced, the arbitration routine 15 reschedules the start of the newly requested program and calculates the disc change times again (step S3), then returns to step S2 to compare the revised disc change times with the disc change times of the other programs once more. Step S3 is carried out by delaying the scheduled start of the newly requested program by a certain amount and setting the calculated disc change times back by the same amount. Steps S2 and S3 are repeated until the calculated disc change times of the newly requested program differ by at least ten seconds from the disc change times of all other programs being reproduced. The calculated disc change times are then written into registers 17 as predicted disc change times (step S4), and reproduction of the newly requested program begins.

Figure 6:
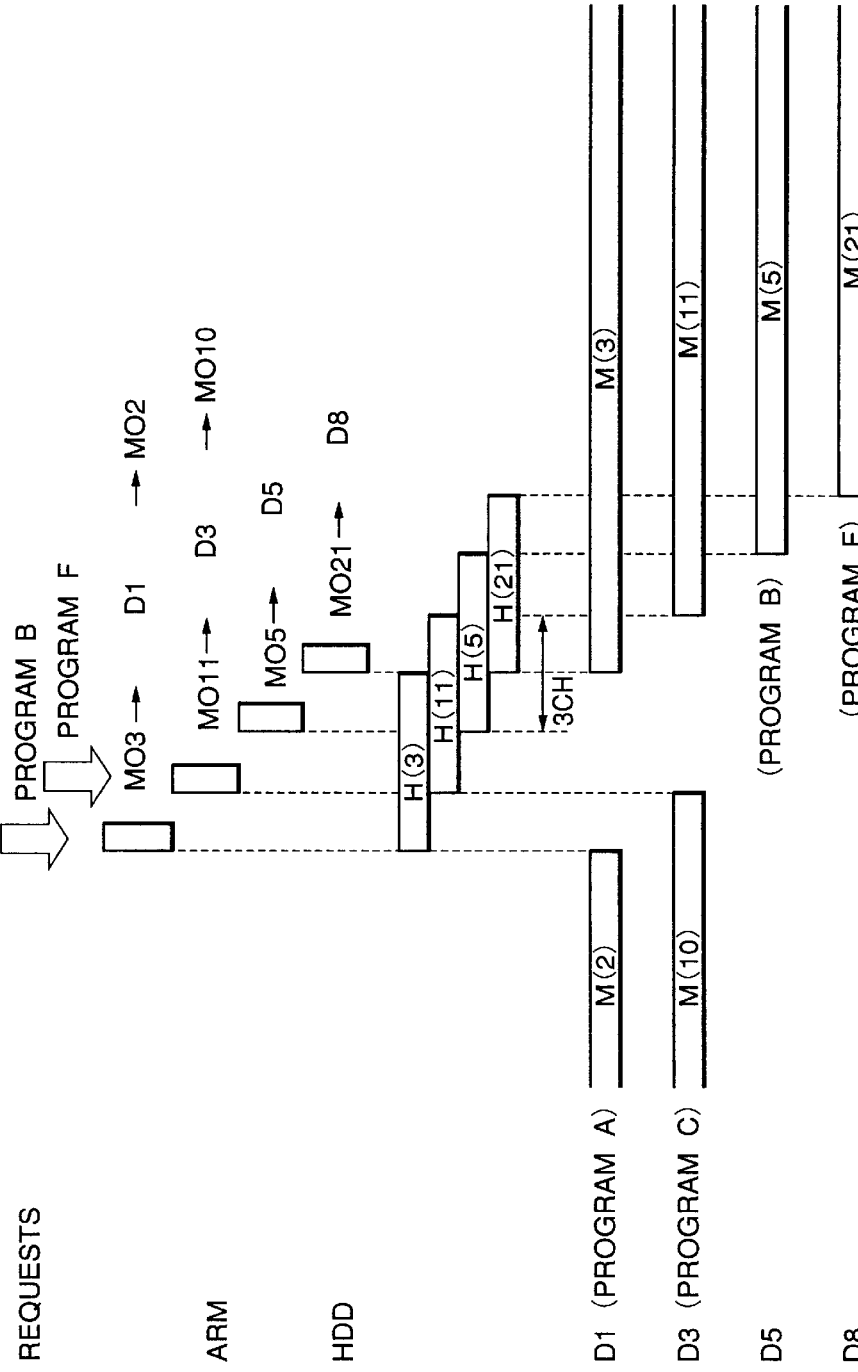
FIG. 6 illustrates the operation of the first embodiment.

This control procedure ensures that no two disc change times occur within the same ten-second interval, and that no more than three lead-in segments are reproduced simultaneously. For example, FIG. 6 shows a case in which a request for program B is received while programs A and C are already being reproduced. The first calculated change time (the starting time) of program B happens to coincide with the change time from disc MO2 to disc MO3 of program A, a time during which lead-in segment H(3) is being reproduced. The arbitration routine 15 sets the start of program B back to, for example, a time ten seconds from the start of lead-in segment H(2). Unfortunately, the start of program B now coincides with the predicted time of the change from disc MO10 to disc MO11 of program C. The control unit 1 accordingly delays the start of program B by another ten seconds, eliminating this disc-change-time conflict. Reproduction of the first lead-in segment H(5) of program B starts ten seconds after the start of lead-in segment H(11) in program C.

In the meantime, a request for program F is received. The start of program F is similarly delayed, to avoid conflicts with the predicted disc change times of programs B and C.

If the request for program B is received just before twelve o'clock, for example, the start of program B is tentatively scheduled for 12:00:00, then moved back ten seconds to 12:00:10, then moved back ten more seconds to 12:00:20. At this point, if each MO disc stores exactly thirty minutes of compressed video data, in addition to the thirty-second lead-in segments, the predicted disc change times for program B are 12:00:20 (the starting time), 12:30:50, 13:01:20, and 13:31:50. The control unit 1 stores these values in the registers 17.

In the ten-second interval at the start of program B, the hard disk drive 2 is simultaneously reproducing lead-in segments H(3), H(11), and H(5), and in the next ten-second interval, lead-in segments H(11), H(5), and H(21) are being reproduced. During these intervals, video data are supplied from the hard disk drive 2 to three channels (3 CH) at once. Each lead-in segment comprises a number of blocks of data; simultaneous reproduction means that the hard disk drive 2 reads blocks of data belonging to the three lead-in segments in turn, one block at a time, and the electronic switch 4 sends each block to the appropriate buffer memory 5. The access speed and data transfer rate of the hard disk drive 2 are high enough to ensure that all necessary data for each of the three lead-in segments can be supplied to the electronic switch 4 within the necessary time. If, for example, each lead-in segment is divided into one-second blocks, and if the hard disk drive 2 is capable of accessing all of the data for a one-second block within a third of a second, then three lead-in segments can be reproduced simultaneously.

The length of the interval within which multiple disc changes are not allowed to occur should be at least equal to the maximum time required to complete a disc change in the jukebox 3, because the movable arm 10 is incapable of changing discs for two drives at once. The length should also be long enough, in relation to the length of the lead-in segments, to ensure that the number of lead-in segments reproduced simultaneously does not exceed the capabilities of the hard disk drive 2. Ten-second intervals combined with thirty-second lead-in segments ensures that no more than three lead-in segments are reproduced at any one time.

By adjusting the starting times of requested programs so as to avoid conflict between disc changes times, conflict being defined as the occurrence of two disc changes within a ten-second interval, the arbitration routine 15 prevents both the movable arm 10 in the jukebox 3 and the hard disk drive 2 from being overloaded with more tasks than they can perform, and ensures that each terminal device 7 receives a continuous video signal, without interruptions at disc changes.

Next, a second embodiment will be described. The second embodiment has the same general configuration as the first embodiment, illustrated in FIGS. 1, 2, and 3.

In the second embodiment, the lead-in segments of video data stored in the hard disk drive 2 partially or completely overlap the video data recorded on the MO discs. In a typical case of partial overlap, the first one-second block of data M(x) is identical to the sixth one-second block of the corresponding lead-in segment H(x), and the first twenty-five seconds of data in M(x) duplicate the last twenty-five seconds of data in H(x).

For partial overlap, the length of the non-overlapping data stored in H(x) but not in M(x) can advantageously be set equal to the minimum time required for a disc change, including the time needed by the MO drive to start spinning the new disc and complete other preparations for reproducing the video data. This time is typically in the range from five to ten seconds.

In the second embodiment, the interface between the control unit 1 and the MO drives in the jukebox 3 enables the control unit 1 to determine when a drive is ready to reproduce data. For example, the standard small computer systems interface (SCSI) can be employed; this interface provides a Test Unit Ready command which the control unit 1 can issue to determine whether a specified drive is ready or not.

Figure 7:
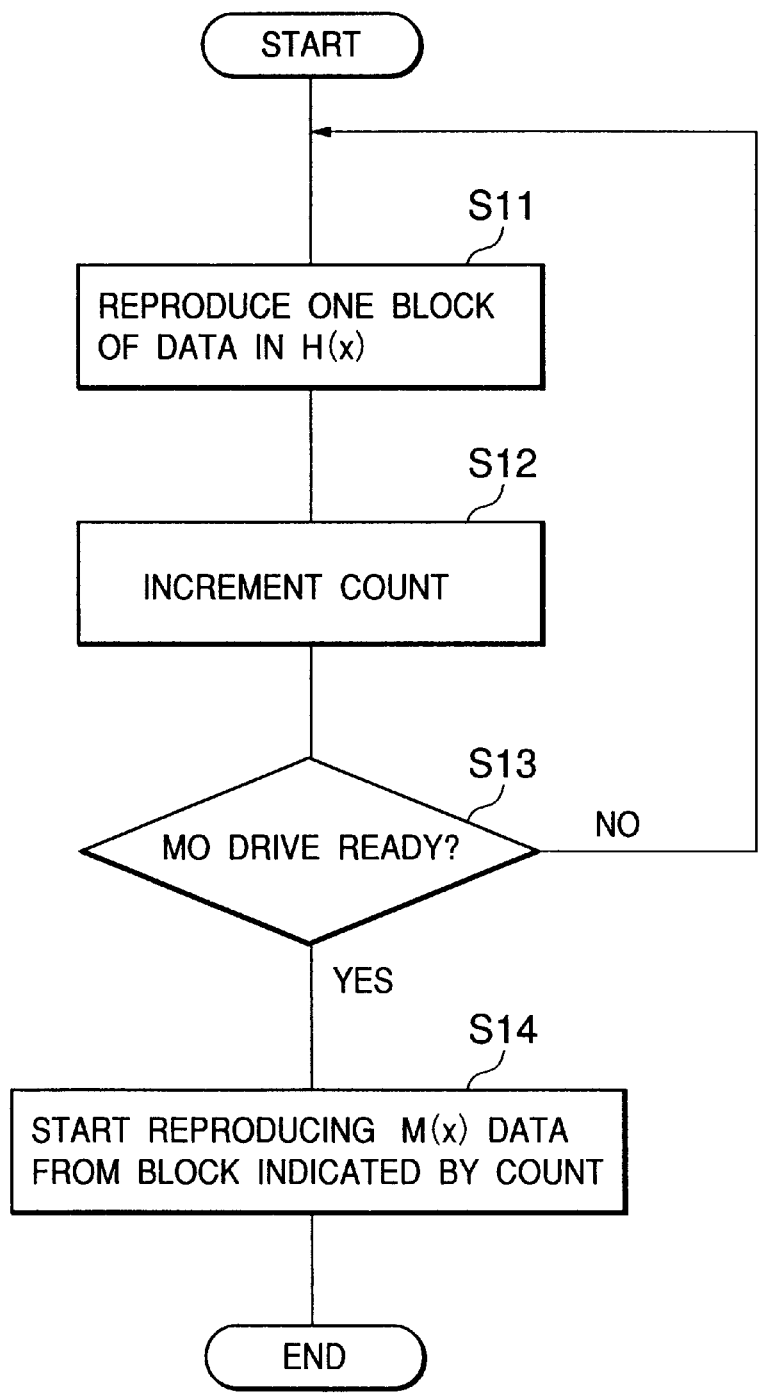
FIG. 7 is a flowchart illustrating a disc change in a second embodiment of the invention.

The disc-changing operation of the second embodiment will be described with reference to the flowchart in FIG. 7.

The operation starts when the control unit 1 issues a command to the jukebox 3 to load a disc MOx into a designated MO drive, and commands the hard disk drive 2 to begin reproducing the corresponding lead-in segment H(x). At this time the control unit 1 also initializes a count, stored in an internal register or in the read-write memory 13, to a value indicating the first block of data in the lead-in segment H(x). The hard disk drive 2 now reads one block of data of H(x) (step S11). The control unit 1 routes the data through the electronic switch 4 to the appropriate buffer memory 5, and increments the count value to indicate that the block has been reproduced (step S12). Next, the control unit 1 determines whether the designated MO drive is ready (step S13), by issuing the Test Unit Ready command, for example. If the MO drive is not ready, the loop from step S11 to S13 is repeated, the hard disk drive 2 reproducing the next block of data in lead-in segment H(x) and the control unit 1 incrementing the count value again. Repetition of this loop continues until the MO drive is ready. At this point, the control unit 1 commands the designated MO drive to begin reproducing data M(x), starting from the block indicated by the count value (step S14), and sets the electronic switch 4 to select the designated MO drive. The control unit 1 also commands the hard disk drive 2 to stop reproducing lead-in segment H(x) at this point, regardless of whether the end of segment H(x) has been reached or not.

Figure 8:
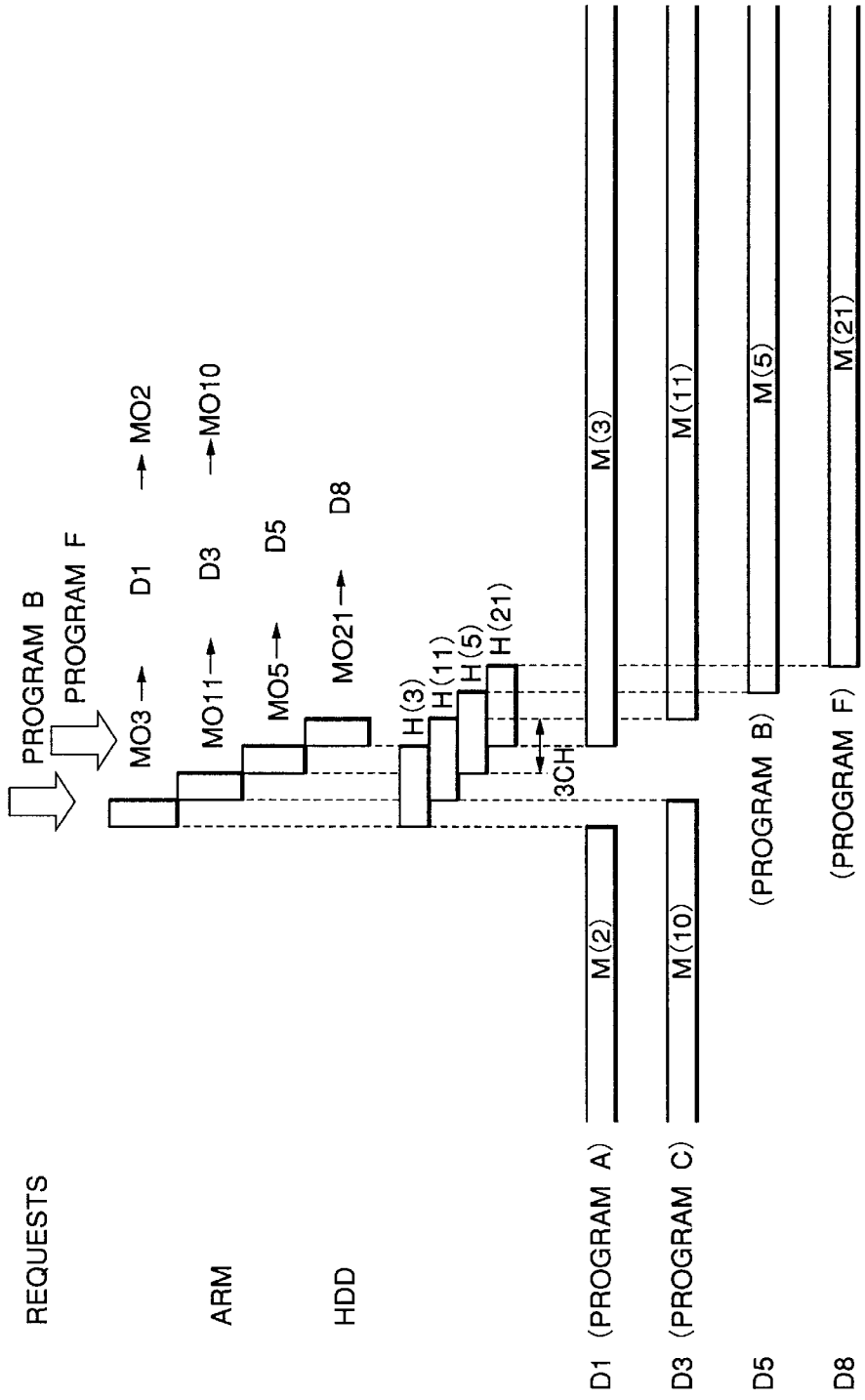
FIG. 8 illustrates the operation of the second embodiment.

FIG. 8 illustrates the operation of the second embodiment under the following conditions. The time required by the movable arm 10 in the jukebox 3 to change a disc is five seconds. The MO drive requires an additional ten seconds to prepare to reproduce data from the new disc. The control unit 1 schedules the program start times so that all disc changes times are mutually separated by intervals of at least five seconds.

Requests for programs B and F are received while lead-in segments of programs A and C are being reproduced from the hard disk drive 2. The control unit 1 schedules the start of programs B and F so that disc change times occur at five-second intervals. The control unit 1 also polls the MO drives (D1, D3, D5, D8) being used to reproduce programs A, C, B, F to learn when each drive is ready, and terminates reproduction of a lead-in segment by the hard disk drive 2 when the corresponding MO drive is ready. Each of the lead-in segments H(3), H(11), H(5), and H(21) is terminated after only fifteen seconds, instead of running for the full thirty seconds. As a result, the number of lead-in segments being reproduced simultaneously does not exceed three, despite the five-second spacing of the disc change times. Furthermore, no user has to wait more than five seconds for the requested program to start.

Figure 9:
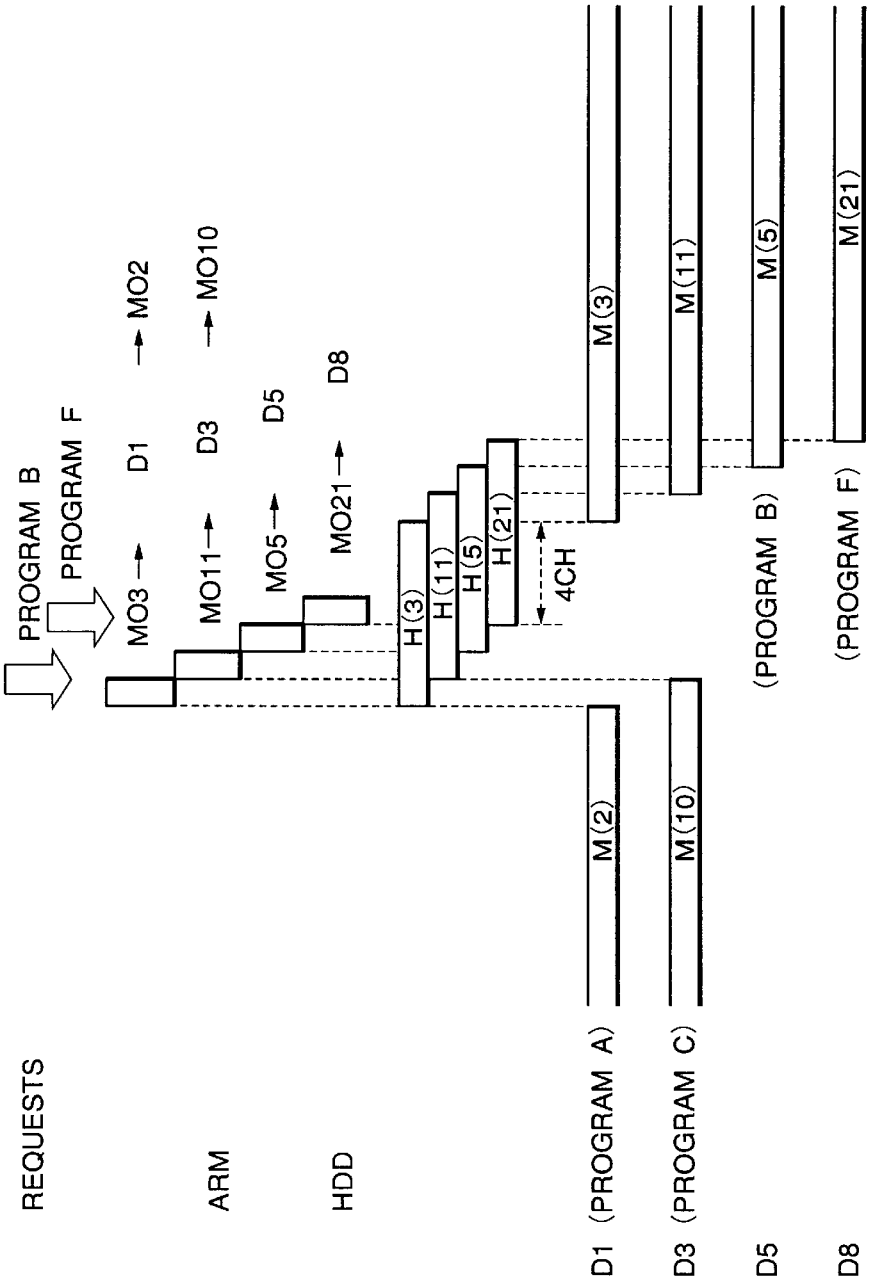
FIG. 9 illustrates a comparable operation in a conventional apparatus.

For comparison, FIG. 9 shows the effect of scheduling the programs as described above, but reproducing each lead-in segment for the full thirty seconds. This creates a ten-second interval during which the hard disk drive 2 is required to supply four channels with video data. The hard disk drive 2 may be unable to meet this requirement, in which case the video data are delayed, and block noise or other picture problems appear on terminal screens.

The second embodiment is not limited to the use of interval spacing control as described in the first embodiment. This control scheme can be replaced with a less stringent control scheme permitting two programs to start substantially simultaneously, for example. Switching over from the lead-in segments to the data stored on the MO discs as soon as the MO drives are ready still has the effect of reducing the load on the hard disk drive 2, avoiding signal interruptions at disc changes, and reducing the time a user may be forced to wait for the start of a requested program.

The invention is not restricted to the use of single-sided MO discs. Other removable media, such as double-sided MO discs or discs conforming to one of the DVD (digital video disc) standards, may be employed.

It is not necessary for all programs to be stored on the same number of MO discs.

The lead-in segments do not have to be stored in a magnetic disk drive. A high-speed optical disc drive can be used, for example, or semiconductor memory can be used.

If the jukebox 3 has more drives than the number of channels, a disc change can be performed by loading the next disc into an idle drive before the end of the current disc is reached. In this case, it is not necessary to store lead-in segments separately. By predicting the disc change times in advance and adjusting the disc change times to avoid conflicts, the arbitration routine 15 in the present invention can assure that an idle drive is available to receive the next disc. If necessary, some overlap can be provided between the data stored on consecutive MO discs.

Those skilled in the art will recognize that further variations are possible within the scope claimed below.

What is claimed is:

1. A video reproducing apparatus having a storage unit storing video data for a plurality of video programs on a plurality of removable media, at least some of the video programs spanning at least two of the removable media, a reproducing unit with a plurality of reproducing means for reproducing the video data from the removable media, a transport means automatically transporting the removable media between the storage unit and the reproducing unit, and a control unit receiving video program requests from a plurality of terminal devices and controlling the transport means and reproducing unit so that each requested video program is reproduced and supplied to the requesting terminal device, wherein the control unit comprises:
   memory means storing predicted times at which each video program currently being reproduced by said reproducing unit will require a change of removable media; and
   processing means calculating the times at which a newly requested video program will require a change of removable media, comparing the calculated times with said predicted times, adjusting said calculated times according to said predicted times, and storing the adjusted calculated times in said memory means as the predicted times at which the newly requested video program will require a change of removable media.

2. The video reproducing apparatus of claim 1, wherein said processing means adjusts said calculated times by adjusting a starting time of said newly requested program.

3. The video reproducing apparatus of claim 1, wherein said processing means adjusts said calculated times so that all of said calculated times differ by at least a predetermined interval from all of said predicted times.

4. The video reproducing apparatus of claim 3, wherein said predetermined interval has a length determined according to a time required by said transport means to change said removable media.

5. The video reproducing apparatus of claim 1, further comprising:
   an auxiliary storage means storing lead-in segments of video data for each of said removable media, and reproducing said lead-in segments while said removable media are being changed; and
   a switching means coupled to said reproducing unit and said auxiliary storage means, selectively supplying the video data reproduced by said reproducing means and the video data reproduced by said auxiliary storage means to said terminal devices; wherein
   said processing means controls said auxiliary storage means and said switching means, and adjusts said calculated times so that at most a predetermined number of said lead-in segments are reproduced simultaneously.

6. The video reproducing apparatus of claim 5, wherein said processing means also receives signals from said reproducing means indicating whether said reproducing means are ready to begin reproducing said video data from said removable media, commands said auxiliary storage means to stop reproducing said lead-in segments when corresponding reproducing means are ready to begin reproducing said video data, and commands said switching means to select said reproducing means as soon as said reproducing means are ready.

7. The video reproducing apparatus of claim 5, wherein the lead-in segment stored on the auxiliary storage means contains non-overlapping data with respect to data of the removable media.

8. The video reproducing apparatus of claim 1, further comprising:

an auxiliary storage means storing lead-in segments of video data for each of said removable media, and reproducing said lead-in segments before the reproducing means begin reproducing the video data stored on the corresponding removable media, the removable media being changed while the lead-in segments are being reproduced; and a switching means coupled to said reproducing unit and said auxiliary storage means, selectively supplying the video data reproduced by said reproducing means and the video data reproduced by said auxiliary storage means to said terminal devices, wherein said processing means controls said auxiliary storage means and said switching means, and adjusts said calculated times according to said predetermined times so that at most a predetermined number of said lead-in segments are reproduced simultaneously.

9. A method of controlling a video reproducing apparatus having a storage unit storing video data for a plurality of video programs on a plurality of removable media, at least some of the video programs spanning at least two of the removable media, a reproducing unit with a plurality of reproducing means for reproducing the video data from the removable media, a transport means automatically transporting the removable media between the storage unit and the reproducing unit, and a control unit receiving video program requests from a plurality of terminal devices and controlling the transport means and reproducing unit so that each requested video program is reproduced and supplied to the requesting terminal device, comprising the steps of:

storing predicted times at which each video program currently being reproduced by said reproducing unit will require a change of removable media in a memory means; and calculating times at which a newly requested video program will require a change of removable media;

comparing the calculated times with said predicted times;

adjusting said calculated times according to said predicted times; and storing the adjusted calculated times in said memory means as the predicted times at which the newly requested video program will require a change of removable media.

10. The method claim 9, wherein said calculated times are adjusted by adjusting a starting time of said newly requested program.

11. The method of claim 9, wherein said calculated times are adjusted so that all of said calculated times differ by at least a predetermined interval from all of said predicted times.

12. The method of claim 11, wherein said predetermined interval has a length determined according to a time required by said transport means to change said removable media.

13. The method of claim 9, further comprising the steps of:

storing lead-in segments of video data for each of said removable media in an auxiliary storage means;

reproducing said lead-in segments while said removable media are being changed; and adjusting said calculated times so that at most a predetermined number of said lead-in segments are reproduced simultaneously.

14. The method of claim 13, further comprising the steps of:

receiving signals from said reproducing means indicating whether said reproducing means are ready to begin reproducing said video data from said removable media; and switching from said lead-in segments to the video data reproduced by said reproducing means as soon as said reproducing means are ready.

15. The method of claim 13, wherein the lead-in segment stored on the auxiliary storage means contains non-overlapping data with respect to data of the removable media.

16. The method of claim 9, further comprising the steps of:

storing lead-in segments of video data for each of said removable media in an auxiliary storage means;

reproducing said lead-in segments before reproducing the video data stored on the corresponding removable media;

changing the removable media while said lead-in segments are being reproduced; and adjusting said calculated times according to said predetermined times so that at most a predetermined number of said lead-in segments are reproduced simultaneously.

* * * * *